(12) United States Patent
Schott et al.

(10) Patent No.: US 9,528,440 B2
(45) Date of Patent: Dec. 27, 2016

(54) GAS TURBINE EXHAUST DIFFUSER STRUT FAIRING HAVING FLOW MANIFOLD AND SUCTION SIDE OPENINGS

(71) Applicant: General Electric Company, Schenectady, NY (US)

(72) Inventors: Carl Gerard Schott, Simpsonville, SC (US); Douglas Frank Beadie, Greer, SC (US); Kenneth Damon Black, Travelers Rest, SC (US); Khoa Dang Cao, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 587 days.

(21) Appl. No.: 13/906,497

(22) Filed: May 31, 2013

(65) Prior Publication Data

US 2014/0352313 A1   Dec. 4, 2014

(51) Int. Cl.
| | | |
|---|---|---|
| F01D 25/30 | (2006.01) | |
| F01D 5/14 | (2006.01) | |
| F02C 7/04 | (2006.01) | |
| F01D 25/16 | (2006.01) | |
| F02C 7/06 | (2006.01) | |

(52) U.S. Cl.
CPC ............... F02C 7/04 (2013.01); F01D 5/145 (2013.01); F01D 25/30 (2013.01); *F01D 25/162* (2013.01); *F02C 7/06* (2013.01); *F05D 2240/121* (2013.01); *F05D 2240/123* (2013.01); *F05D 2240/124* (2013.01)

(58) Field of Classification Search
CPC .............. F01D 25/30; F01D 9/00; F01D 9/02; F01D 9/04; F01D 9/041; F01D 5/145; F01D 9/065; F05D 2240/12; F05D 2240/121; F05D 2240/123; F05D 2240/124
USPC .... 60/751, 770, 39.5; 415/216.1, 182.1, 115
See application file for complete search history.

(56) References Cited

U.S. PATENT DOCUMENTS

| | | | | |
|---|---|---|---|---|
| 4,026,659 A | * | 5/1977 | Freeman, Jr. ........... | F01D 9/041 415/115 |
| 4,314,442 A | * | 2/1982 | Rice ....................... | F01D 5/185 415/114 |
| 4,565,490 A | * | 1/1986 | Rice ....................... | F01K 23/10 415/114 |
| 6,792,758 B2 | * | 9/2004 | Dowman ............... | F01D 17/162 415/142 |
| 6,807,803 B2 | | 10/2004 | Poccia et al. | |
| 6,997,676 B2 | * | 2/2006 | Koshoffer ............... | F01D 5/146 415/115 |
| 7,707,818 B2 | | 5/2010 | Venkataraman et al. | |
| 7,942,004 B2 | | 5/2011 | Hodder | |
| 7,980,055 B2 | | 7/2011 | Lindenfeld | |

(Continued)

*Primary Examiner* — Gerald L Sung
*Assistant Examiner* — Alain Chau
(74) *Attorney, Agent, or Firm* — Dority & Manning, PA (57) ABSTRACT

A diffuser strut fairing includes a top portion, a bottom portion, a pressure side portion, a suction side portion, an inner surface and an outer surface. The pressure side portion and the suction side portion extend between the top portion and the bottom portion. The exhaust diffuser strut faring further includes a flow manifold that is at least partially defined between the pressure side portion and the suction side portion. A plurality of openings is disposed along the suction side portion and are in fluid communication with the flow manifold.

10 Claims, 5 Drawing Sheets

(56) References Cited

U.S. PATENT DOCUMENTS

| | | | |
|---|---|---|---|
| 2009/0263243 A1* | 10/2009 | Little | F01D 25/14 |
| | | | 415/216.1 |
| 2011/0232291 A1 | 9/2011 | Luedke et al. | |
| 2012/0186261 A1* | 7/2012 | Toprani | F01D 9/065 |
| | | | 60/772 |
| 2012/0290250 A1 | 11/2012 | Snider et al. | |

* cited by examiner

GAS TURBINE EXHAUST DIFFUSER STRUT FAIRING HAVING FLOW MANIFOLD AND SUCTION SIDE OPENINGS

FIELD OF THE INVENTION

The present invention generally involves a diffuser strut for an exhaust diffuser of a gas turbine. More specifically, the present invention relates to a diffuser strut fairing that at least partially surrounds the diffuser strut.

BACKGROUND OF THE INVENTION

Gas turbines are widely used in industrial and power generation operations. A typical gas turbine includes a compressor section, a combustor downstream from the compressor section, and a turbine section downstream from the combustor. A working fluid such as ambient air flows into the compressor section where it is compressed before flowing into the combustor. The compressed working fluid is mixed with a fuel and burned within the combustor to generate combustion gases having a high temperature, pressure, and velocity. The combustion gases flow from the combustor and expand rapidly through the turbine section to rotate a shaft and to produce work. The combustion gases are then exhausted from the turbine section through an exhaust diffuser positioned downstream from the turbine section.

The exhaust diffuser typically includes an inner shell and an outer shell that is radially separated from the inner shell to form an exhaust flow passage through the diffuser. One or more generally airfoil shaped diffuser struts extend between the inner and outer shells within the exhaust flow passage to provide structural support to the outer shell and/or to an aft bearing that supports the shaft. Aerodynamic performance of the exhaust diffuser is an important component of overall gas turbine output and heat rate.

As the combustion gases flow through the exhaust flow passage and across the diffuser struts, overall aerodynamic performance of the gas turbine is impacted. As a result, diffuser strut designs are typically optimized for base-load or full-speed/full-load operation of the gas turbine to improve gas turbine efficiency during regular and peak power demands. However, the gas turbine may also operate in a part-load condition which results in increased swirl of the combustion gases exiting the turbine and entering the exhaust diffuser. The increased swirl triggers flow separation from a suction side of the diffuser struts which impacts the aerodynamic performance of the gas turbine during part-load operation and has an impact on overall gas turbine efficiency. Therefore, an improved diffuser strut design which reduces flow separation across the diffuser struts when operating the gas turbine outside of base-load and/or full-speed/full-load operation would be useful in the art.

BRIEF DESCRIPTION OF THE INVENTION

Aspects and advantages of the invention are set forth below in the following description, or may be obvious from the description, or may be learned through practice of the invention.

One embodiment of the present invention is a diffuser strut fairing. The diffuser strut fairing having a top portion, a bottom portion, a pressure side portion, a suction side portion, an inner surface and an outer surface. The pressure side portion and the suction side portion extend between the top portion and the bottom portion. The exhaust diffuser strut faring further includes a flow manifold that is at least partially defined between the pressure side portion and the suction side portion and a plurality of openings that are disposed along the suction side portion. The plurality of openings being in fluid communication with the flow manifold.

Another embodiment of the present invention is an exhaust diffuser. The exhaust diffuser includes an outer shell that is radially separated from an inner shell and an exhaust flow passage that is defined therebetween. A diffuser strut extends between the inner shell and the outer shell within the flow passage. The diffuser strut includes a pressure side, a suction side and a leading edge. The exhaust diffuser further includes an exhaust diffuser strut faring that extends around the leading edge of the diffuser strut. The diffuser strut fairing has a suction side portion that extends across a portion of the suction side of the diffuser strut. A flow manifold is at least partially defined by the diffuser strut fairing. A plurality of openings is disposed along the suction side portion of the exhaust diffuser strut faring. The plurality of openings is in fluid communication with the flow manifold.

The present invention also includes a gas turbine. The gas turbine includes a compressor section, a combustion section that is disposed downstream from the compressor section, a turbine section that is disposed downstream from the combustion section, and an exhaust diffuser that is disposed downstream from the turbine section. The exhaust diffuser includes an outer shell radially separated from an inner shell and an exhaust flow passage that is defined therebetween. The exhaust diffuser further comprises a diffuser strut that extends between the inner shell and the outer shell within the flow passage. The diffuser strut includes a pressure side, a suction side and a leading edge. The exhaust diffuser further includes an exhaust diffuser strut faring that extends around the leading edge of the diffuser strut. The diffuser strut fairing includes a suction side portion that extends across a portion of the suction side of the diffuser strut. The exhaust differ further includes a flow manifold that is at least partially defined by the diffuser strut fairing. A plurality of openings is disposed along the suction side portion of the exhaust diffuser strut faring. The plurality of openings is in fluid communication with the flow manifold.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an exhaust diffuser incorporated into an industrial gas turbine for purposes of illustration, one of ordinary skill in the art will readily appreciate that embodiments of the present invention may be applied to any exhaust diffuser incorporated into any turbomachine and is not limited to an industrial gas turbine unless specifically recited in the claims.

Figure 1:
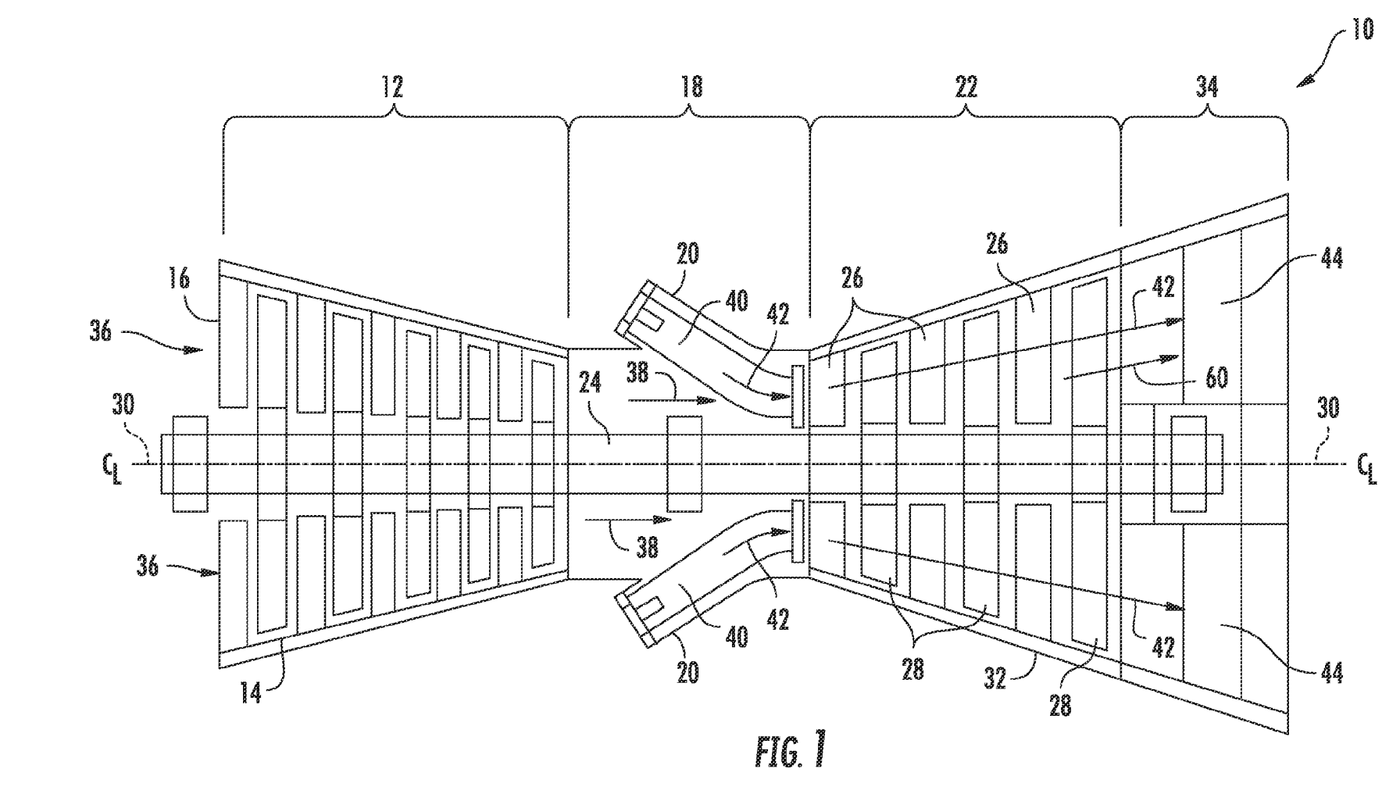
FIG. 1 illustrates a cross section side view of an exemplary known gas turbine as may incorporate various embodiments of the present invention.

Referring now to the drawings, wherein identical numerals indicate the same elements throughout the figures, FIG. 1 illustrates an example of a known gas turbine 10 as may incorporate various embodiments of the present invention. As shown, the gas turbine 10 generally includes a compressor section 12. The compressor section 12 includes a compressor 14. The compressor includes an inlet 16 that is disposed at an upstream end of the gas turbine 10. The gas turbine 10 further includes a combustion section 18 having one or more combustors 20 disposed downstream from the compressor section 12. The gas turbine further includes a turbine section 22 that is downstream from the combustion section 18. A shaft 24 extends generally axially through the gas turbine 10. The turbine section 22 generally includes alternating stages of stationary nozzles 26 and turbine rotor blades 28 positioned within the turbine section 22 along an axial centerline 30 of the shaft 24. An outer casing 32 circumferentially surrounds the alternating stages of stationary nozzles 26 and the turbine rotor blades 28. An exhaust diffuser 34 is positioned downstream from the turbine section 22.

In operation, ambient air 36 or other working fluid is drawn into the inlet 16 of the compressor 14 and is progressively compressed to provide a compressed air 38 to the combustion section 18. The compressed air 38 flows into the combustion section 18 and is mixed with fuel to form a combustible mixture which is burned in a combustion chamber 40 defined within each combustor 20, thereby generating a hot gas 42 that flows from the combustion chamber 40 into the turbine section 22. The hot gas 42 rapidly expands as it flows through the alternating stages of stationary nozzles 26 and turbine rotor blades 28 of the turbine section 22.

Thermal and/or kinetic energy is transferred from the hot gas 42 to each stage of the turbine rotor blades 28, thereby causing the shaft 24 to rotate and produce mechanical work. The hot gas 42 exits the turbine section 22 and flows through the exhaust diffuser 34 and across a plurality of generally airfoil shaped diffuser struts 44 that are disposed within the exhaust diffuser 34. During various operating conditions of the gas turbine such as during part-load operation, the hot gas 42 flowing into the exhaust diffuser 34 from the turbine section 22 has a high level of swirl that is caused by the rotating turbine rotor blades 28. As a result of the swirling hot gas 42 exiting the turbine section 22, flow separation of the hot gas 42 from the exhaust diffuser struts occurs which compromises the aerodynamic performance of the gas turbine 10, thereby impacting overall engine output and heat rate.

Figure 2:
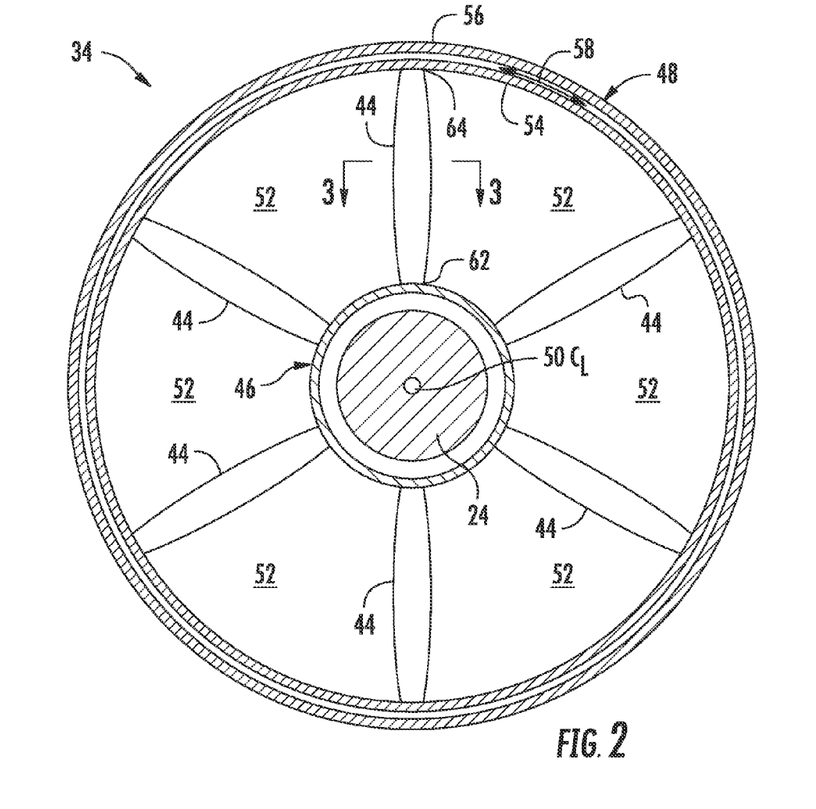
FIG. 2 illustrates a simplified cross sectional downstream view of an exemplary exhaust diffuser as shown in FIG. 1, as may incorporate various embodiments of the present invention.

FIG. 2 shows a simplified cross sectional downstream view of an exemplary exhaust diffuser 34 as may be used for the present invention. As shown, the exhaust diffuser 34 generally includes an inner shell 46 and an outer shell 48. The inner shell 46 extends generally axially along an axial centerline 50 of the exhaust diffuser 34. The inner shell 46 is generally annular shaped and may at least partially surround rotating components. For example, the inner shell 46 may surround or encase a portion of the shaft 24.

As shown in FIG. 2, the outer shell 48 is radially separated from the inner shell 46. In particular embodiments, the inner shell 46 is concentrically and coaxially aligned within the outer shell 48 with respect to the axial centerline 50. An exhaust flow passage 52 is generally defined between the inner shell 46 and the outer shell 48. In certain embodiments, the outer shell 48 may have a double walled construction, with an inner casing 54 that is radially separated from an outer casing 56. A compressed working fluid plenum 58 may be defined between within the outer casing 56. For example, the compressed working fluid plenum 58 may be at least partially defined between the inner casing 54 and the outer casing 56. In other embodiments, the compressed working fluid plenum 58 may be defined within the inner casing 54. The present disclosure is not limited to any particular size, shape, material, or other physical characteristics of the inner shell 46, the outer shell 48 and/or the inner or outer casings 54, 56, except as recited in the claims.

As shown in FIG. 2, each of the diffuser struts 44 extends between the inner shell 46 and the outer shell 48 within the flow passage 52 defined therebetween. The diffuser struts 44 are spaced circumferentially around the inner shell 46. The diffuser struts 44 generally orient the inner shell 46 to the outer shell 48. In addition, the diffuser struts 44 may provide structural support between the inner and the outer shells 46, 48. As shown in FIG. 1, the diffuser struts 44 are positioned relative to a direction of flow 60 of the hot gas 42 flowing from the turbine section 22 of the gas turbine 10.

As shown in FIG. 2, each diffuser strut 44 generally includes a root portion 62 that is connected to the inner shell 46, and a tip portion 64 radially separated from the root portion 60. The tip portion 64 may be connected to the outer shell 48 and/or to the inner casing 54. In the context of the present invention, the term "diffuser strut" includes any structure or supporting member that extends between the inner shell 46 and the outer shell 48 and/or the inner casing 54.

Figure 3:
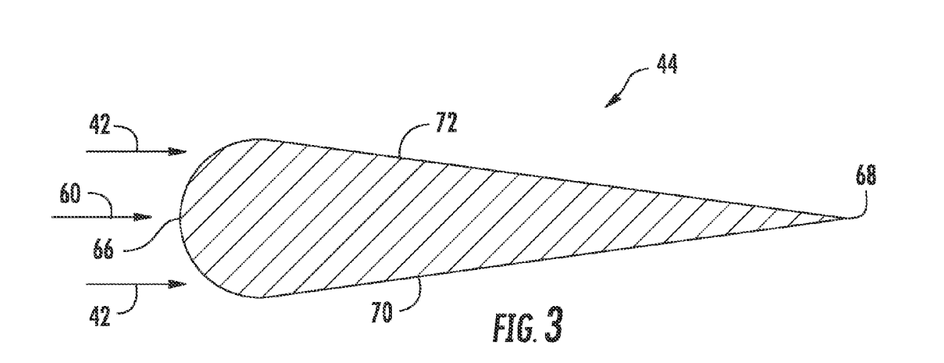
FIG. 3 illustrates a cross-section top view of an exemplary diffuser strut taken along section line 3-3 as shown in FIG. 2, according to various embodiments of the present invention.

FIG. 3 shows a cross-section of an exemplary one of the diffuser struts 44 taken along section line 3-3 as shown in FIG. 2, according to various embodiments of the present invention. As shown in FIG. 3, the diffuser strut 44 may be generally airfoil shaped. For example, the diffuser strut 44 includes a leading edge 66, a trailing edge 68 that is downstream from the leading edge 66 with respect to the direction of flow 60 of the hot gas 42, a pressure side 70 and a suction side 72 that is opposite to the pressure side 70. It should be obvious to one of ordinary skill in the art that the pressure side 70 and the suction side 72 may correspond to either one of opposing sides of the diffuser strut 44 depending on the direction of flow 60 of the hot gas 42 exiting the turbine section 22. In particular embodiments, the airfoil shape of the diffuser strut 44 may be at least partially defined by an outer skin or fairing (not shown) that at least partially surrounds the diffuser strut 44.

Figure 4:
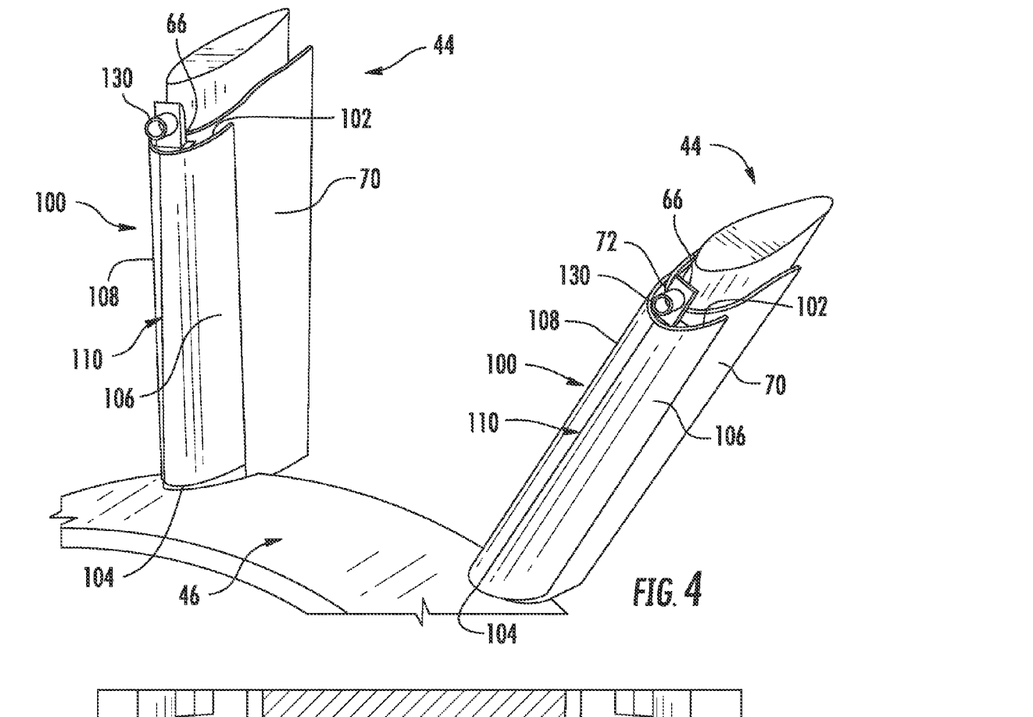
FIG. 4 illustrates a perspective view of two adjacent diffuser struts and a portion of an inner shell of the exhaust diffuser as shown in FIG. 3, according to at least one embodiment of the present invention.

FIG. 4 provides a perspective view of two adjacent diffuser struts 44 and a portion of the inner shell 46 according to at least one embodiment of the present invention. In particular embodiments, as shown in FIG. 4 a diffuser strut fairing 100 extends at least partially around each exhaust strut 44. The diffuser strut fairing 100 may be retrofitted to existing exhaust diffusers or may be incorporated into new diffuser strut designs. The diffuser strut fairing 100 includes a top portion 102, a bottom portion 104, a pressure side portion 106 and a suction side portion 108. The pressure side portion 106 and the suction side portion 108 extend between the top portion and the bottom portion.

Figure 5:
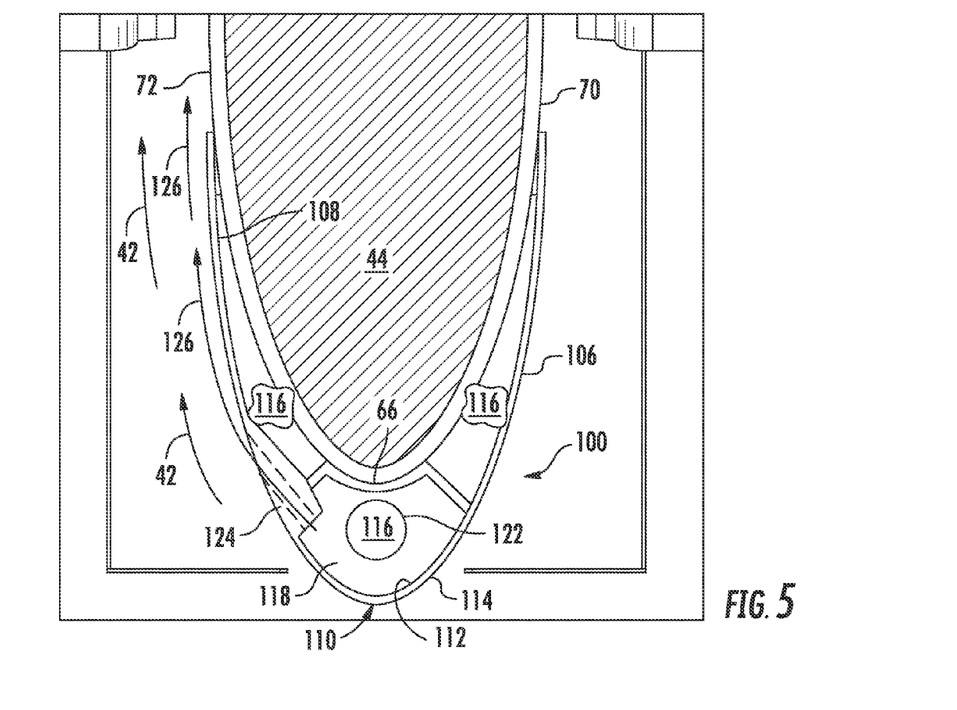
FIG. 5 illustrates a cross section top view of one of the diffuser struts as shown in FIG. 4 including a diffuser strut fairing, according to at least one embodiment of present invention.

FIG. 5 provides a cross section top view of one of the diffuser struts 44 including the diffuser strut fairing 100 as shown in FIG. 4, according to particular embodiments. As shown in FIGS. 4 and 5, the diffuser strut fairing 100 extends around the leading edge of the diffuser strut 44. In particular embodiments, the diffuser strut fairing 100 extends around the leading edge 66 of the diffuser strut 44 from the pressure side 70 to the suction side 72. As shown, the pressure side portion 106 and the suction side portion 108 intersect to form a leading edge portion 110 that extends between the top portion 102 and the bottom portion 104 of the diffuser strut fairing 100. In particular embodiments, the leading edge portion 110 of the diffuser strut faring 100 is substantially aligned with the leading edge 66 of the diffuser strut 44.

As shown in FIG. 5, the diffuser strut fairing 100 includes an inner surface 112 and an outer surface 114. The inner surface 112 and the outer surface extend between the pressure side portion 106, the suction side portion 108, the top portion 102 and the bottom portion 104 of the diffuser strut fairing. The pressure side portion 106 may extend at least partially across a portion of the pressure side 70 of the diffuser strut 44. The suction side portion 108 extends at least partially across the suction side 72 of the diffuser strut 44. The pressure side portion 106 may be immediately adjacent to the pressure side 70 of the diffuser strut 44. The suction side portion 108 may be immediately adjacent to the suction side 72 of the diffuser strut 44. In particular embodiments, the pressure side portion 106 is mechanically attached to the pressure side 70 of the diffuser strut 44 such as by brazing or welding. In particular embodiments, the suction side portion 108 is mechanically attached to the suction side 72 of the diffuser strut 44 such as by brazing or welding.

In particular embodiments, the diffuser strut fairing 100 at least partially defines a flow manifold 116. The flow manifold 116 is at least partially defined by at least one of the pressure side portion 106, the leading edge portion 110 or the suction side portion 108. The flow manifold may be at least partially defined between the diffuser strut faring 100 and the diffuser strut 44. For example, the flow manifold 116 may be at least partially defined between the inner surface 112 of the diffuser strut faring 100 and a portion of the diffuser strut 44.

Figure 6:
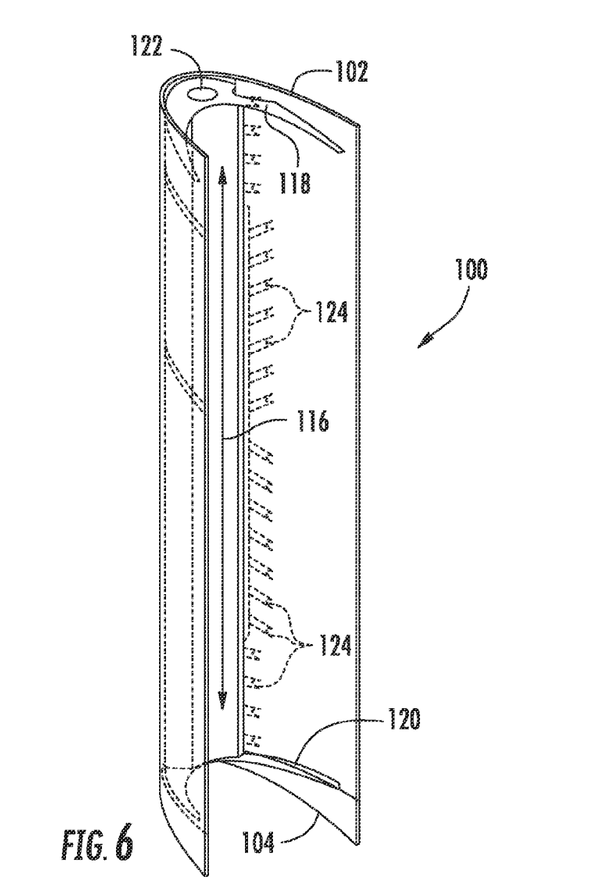
FIG. 6 illustrates a perspective backside view of the diffuser strut fairing as shown in FIGS. 4 and 5, according to one embodiment of the present invention.

FIG. 6 provides a perspective backside view of the diffuser strut fairing as shown in FIGS. 4 and 5, according to one embodiment of the present invention. In one embodiment, as shown in FIG. 6, the diffuser strut fairing 100 includes a top plate 118 and a bottom plate 120. The top plate 118 is disposed generally proximate to the top portion 102 of the diffuser strut fairing 100. The bottom plate 120 is disposed generally proximate to the bottom portion 104 of the diffuser strut fairing 100. In particular embodiments, the top plate 118 and/or the bottom plate 120 at least partially define the flow manifold 116. For example, in one embodiment the top plate 118 and/or the bottom plate 120 extends between the inner surface 112 of the diffuser strut fairing 100 and the diffuser strut 44 to at least partially define the flow manifold 116. In other embodiments, the top plate 118 and/or the bottom plate 120 extends along the inner surface 112 between the pressure side portion 106 and the suction side portion 108 to at least partially define the flow manifold 116. At least one of the top plate 118 or the bottom plate 120 may include a flow passage 122 to allow for fluid communication into the flow manifold 116.

Figure 7:
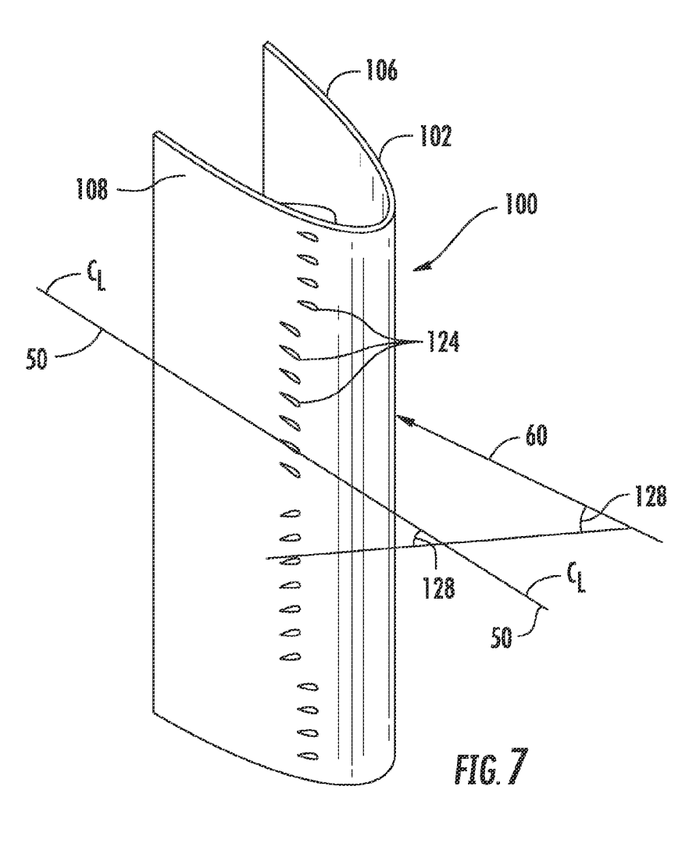
FIG. 7 illustrates a perspective frontal view of the diffuser strut fairing as shown in FIGS. 4, 5 and 6, according to at least one embodiment of the present invention.

FIG. 7 provides a perspective frontal view of the diffuser strut fairing 100 as shown in FIGS. 4, 5 and 6 according to at least one embodiment of the present invention. In particular embodiments, as shown in FIGS. 5, 6 and 7, a plurality of openings 124 is disposed along the suction side portion 108 of the diffuser strut fairing 100. In particular embodiments, at least some of the plurality of openings 124 are disposed proximate and/or adjacent to the leading edge 110 of the diffuser strut fairing 100. As shown in FIG. 5, the openings 124 are in fluid communication with the flow manifold 116. During operation, a compressed working fluid 126 such as compressed air or steam is routed from the flow manifold 116 through the openings 124 and along the suction side 108 of the diffuser strut 44.

At least some of the openings 124 may be configured to provide and/or re-energize a boundary layer of the hot gas 42 across the suction side portion 108 of the diffuser strut fairing 100 and/or across at least a portion of the suction side 72 of the diffuser strut 44 during various operational modes of the gas turbine 10 such as during part-load operation. For example, as shown in FIG. 7, at least some of the plurality of openings 124 may extend generally axially across the suction side portion 108 of the diffuser strut fairing 100. The compressed working fluid 126 increases flow velocity across the suction side portion 108 of the diffuser strut fairing 100 and/or the suction side 72 of the diffuser strut 44. As a result, flow separation of the hot gas 42 from the suction side 108 of the diffuser strut 44 may be delayed and/or prevented, thereby enhancing overall performance of the gas turbine 10 and reducing the heat rate of the gas turbine 10.

As shown in FIG. 7 at least some of the plurality of openings 124 may be set at an angle 128 with respect to a plane that extends substantially parallel to the axial centerline 50 of the exhaust diffuser 34 and/or with respect to the direction of flow 60 through the flow passage 52. The angle 128 may be either acute or obtuse so as to direct the flow of the compressed working fluid 126 towards the top portion 102 of the diffuser strut fairing 100 or the tip 64 (FIG. 2) of the diffuser strut 44 or to direct the flow of the compressed working fluid 126 towards the bottom portion of the diffuser strut fairing 100 and/or the root 62 (FIG. 2) of the diffuser strut 44.

Figure 8:
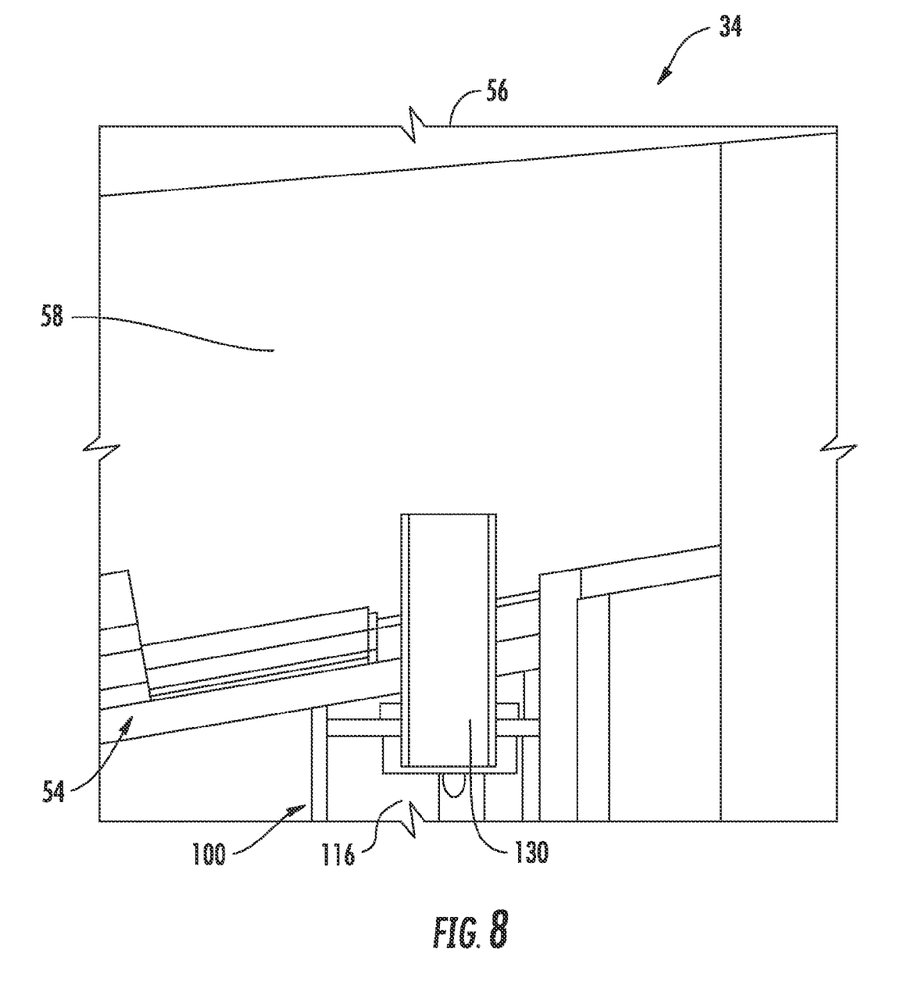
FIG. 8 illustrates a cross section side view of a portion of the exhaust diffuser and a portion of the diffuser strut fairing as shown in FIG. 4, according to one embodiment of present invention.

FIG. 8 provides a cross section side view of a portion of the exhaust diffuser 34 having including the a portion of the inner casing 54, a portion of the outer casing 56, a portion of the compressed working fluid plenum 58 and a portion of the diffuser strut fairing 100. As shown in FIGS. 4 and 8, the diffuser strut fairing 100 may further include a fluid conduit or coupling 130 that provides for fluid communication into the flow manifold 116. In one embodiment, the fluid conduit may be in fluid communication with the compressed working fluid plenum 58. In other embodiments, the fluid conduit 130 may be coupled to an external compressed working fluid supply (not shown) through one or more fluid couplings.

In operation, particularly during part-load operation of the gas turbine, the compressed working fluid 126 is injected into the flow manifold 116. The compressed working fluid 126 is routed through the openings 124 along the suction side portion 108 of the diffuser strut fairing 100. The compressed working fluid 126 flows across the outer surface 114 of the suction side portion 108 and the suction side 72 of the diffuser strut 44 at a relatively high velocity with respect to the hot gas 42 flowing across the diffuser struts 44. The compressed working fluid 126 delays flow separation from the suction side 108 of the diffuser strut 44, thereby increasing overall output of the gas turbine 10 and/or reducing heat rate of the gas turbine 10. This increases a separation free operating envelope of the exhaust struts 44 which enhances overall performance of the gas turbine 10, particularly at part-load or less than base-load operating conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An exhaust diffuser, comprising
a flow passage defined between an outer shell and an inner shell and a diffuser strut that extends between the inner shell and the outer shell within the flow passage, the diffuser strut having a pressure side, a suction side and a leading edge;
a diffuser strut fairing that extends around the leading edge of the diffuser strut, the diffuser strut fairing having a suction side portion that is connected to the suction side of the diffuser strut, a pressure side portion that is connected to the pressure side of the diffuser strut, a top plate that is located at an end of the diffuser strut fairing proximate the outer shell and extends from an inner surface of the diffuser strut fairing and is connected to the pressure side, the suction side and the leading edge of the diffuser strut, and a bottom plate that is located at an end of the diffuser strut fairing proximate the inner shell and extends from the inner surface of the diffuser strut fairing and is connected to the pressure side, the suction side and the leading edge of the diffuser strut, wherein the diffuser strut fairing, the top plate, the bottom plate and the diffuser strut define a flow manifold therebetween, wherein the diffuser strut fairing defines a plurality of openings disposed along at least one of the pressure side portion and the suction side of the diffuser strut fairing;
and a fluid conduit connected to the top plate forming a fluid intake located upstream of the leading edge of the diffuser strut with respect to a flow through the flow passage, wherein the fluid conduit provides fluid communication through the top plate and into the flow manifold.

2. The exhaust diffuser as in claim 1, wherein the plurality of openings is disposed along the pressure side portion of the diffuser strut fairing.

3. The exhaust diffuser as in claim 1, wherein the plurality of openings is disposed along the suction side portion of the diffuser strut fairing.

4. The exhaust diffuser as in claim 1, wherein one or more of the plurality of openings is set at an angle with respect to a direction of flow through the flow passage.

5. The exhaust diffuser as in claim 1, wherein at least some of the plurality of openings is configured to provide a boundary layer of a compressed working fluid from the flow manifold across at least a portion of the suction side of the diffuser strut.

6. A gas turbine, comprising:
a combustion section disposed downstream from the compressor section;
a turbine section disposed downstream from the combustion section; and
an exhaust diffuser disposed downstream from the turbine section, the exhaust diffuser having an outer shell radially separated from an inner shell and an exhaust flow passage defined therebetween, the exhaust diffuser comprising;
a diffuser strut that extends between the inner shell and the outer shell within the flow passage, the diffuser strut having a pressure side, a suction side and a leading edge;
a diffuser strut fairing that extends around the leading edge of the diffuser strut, the diffuser strut fairing having a suction side portion that is connected to the suction side of the diffuser strut, a pressure side portion that is connected to the pressure side of the diffuser strut, a top plate that is located at an end of the diffuser strut fairing proximate the outer shell and extends from an inner surface of the diffuser strut fairing and is connected to the pressure side, the suction side and the leading edge of the diffuser strut, and a bottom plate that is located at an end of the diffuser strut fairing proximate the inner shell and extends from the inner surface of the diffuser strut fairing and is connected to the pressure side, the suction side and the leading edge of the diffuser strut, wherein the diffuser strut fairing, the top plate, the bottom plate and the diffuser strut define a flow manifold therebetween and wherein the diffuser strut fairing defines a plurality of openings disposed along at least one of the pressure side portion and the suction side of the diffuser strut fairing; and a fluid conduit connected to the top plate forming a fluid intake located upstream of the leading edge of the diffuser strut with respect to a flow through the exhaust flow passage, wherein the fluid conduit provides fluid communication through the top plate and into the flow manifold.

7. The gas turbine as in claim 6, wherein the plurality of openings is disposed along the pressure side portion of the diffuser strut fairing.

8. The gas turbine as in claim 6, wherein the plurality of openings is disposed along the suction side portion of the diffuser strut fairing.

9. The gas turbine as in claim 6, wherein one or more of the plurality of openings is set at an angle with respect to a direction of flow through the flow passage.

10. The gas turbine as in claim 6, wherein at least one of the plurality of openings is configured to provide a boundary layer of a compressed working fluid from the flow manifold across at least a portion of the suction side of the diffuser strut.

\* \* \* \* \*